United States Patent [19]
Mauger et al.

[11] 3,986,586
[45] Oct. 19, 1976

[54] BRAKE MECHANISM AND COOLING STRUCTURE THEREFOR

[75] Inventors: David W. Mauger, Thiensville; Frank L. Klafka, Milwaukee, both of Wis.

[73] Assignee: Clevepak Corporation, New York, N.Y.

[22] Filed: Oct. 31, 1974

[21] Appl. No.: 519,662

[52] U.S. Cl. ............................. 188/264 R; 188/75; 192/79; 192/113 A
[51] Int. Cl.² ..................................... F16D 65/807
[58] Field of Search ............ 188/75, 218 R, 264 R, 188/76, 264 E; 192/79, 113 A, 113 B

[56] References Cited
UNITED STATES PATENTS

| | | | |
|---|---|---|---|
| 1,245,040 | 10/1917 | Scaife | 188/264 E |
| 1,966,169 | 7/1934 | Forbes | 188/218 R X |
| 2,512,360 | 6/1950 | McLean | 192/113 A X |
| 2,622,506 | 12/1952 | Finizie | 188/75 |
| 2,844,230 | 7/1958 | Armstrong | 192/113 B X |
| 2,851,132 | 9/1958 | James | 188/264 R |
| 3,000,472 | 9/1961 | Sturgis | 188/264 R |
| 3,200,910 | 8/1965 | Cunningham et al. | 188/85 |

FOREIGN PATENTS OR APPLICATIONS

| | | | |
|---|---|---|---|
| 664,682 | 4/1929 | France | 188/264 R |
| 946,299 | 12/1948 | France | 188/264 R |
| 1,099,546 | 3/1955 | France | 188/264 R |

*Primary Examiner*—George E. A. Halvosa
*Attorney, Agent, or Firm*—Rogers, Eilers & Howell

[57] ABSTRACT

A brake, particularly adapted to stop feeder rolls of a paperboard partition assembly machine quickly, of the drum and embracing arms type, the two brake arms spring-urged into contact with the drum, with cam-operated means for separating brake shoes from the drum; there being cooling means for the brake including integral air-cooling ribs projecting from the brake arms, and air pressure means having two circumferentially and axially spaced outlets on each brake arm to direct air through the brake arm and the brake lining to the outer surface of the drum both to cool the outer parts of the drum and to clean the outer surface, the outlets being automatically cut off when the brake is in braking position, and there are air-circulating fins on the brake drum that draw air across the inner parts of the drum.

5 Claims, 3 Drawing Figures

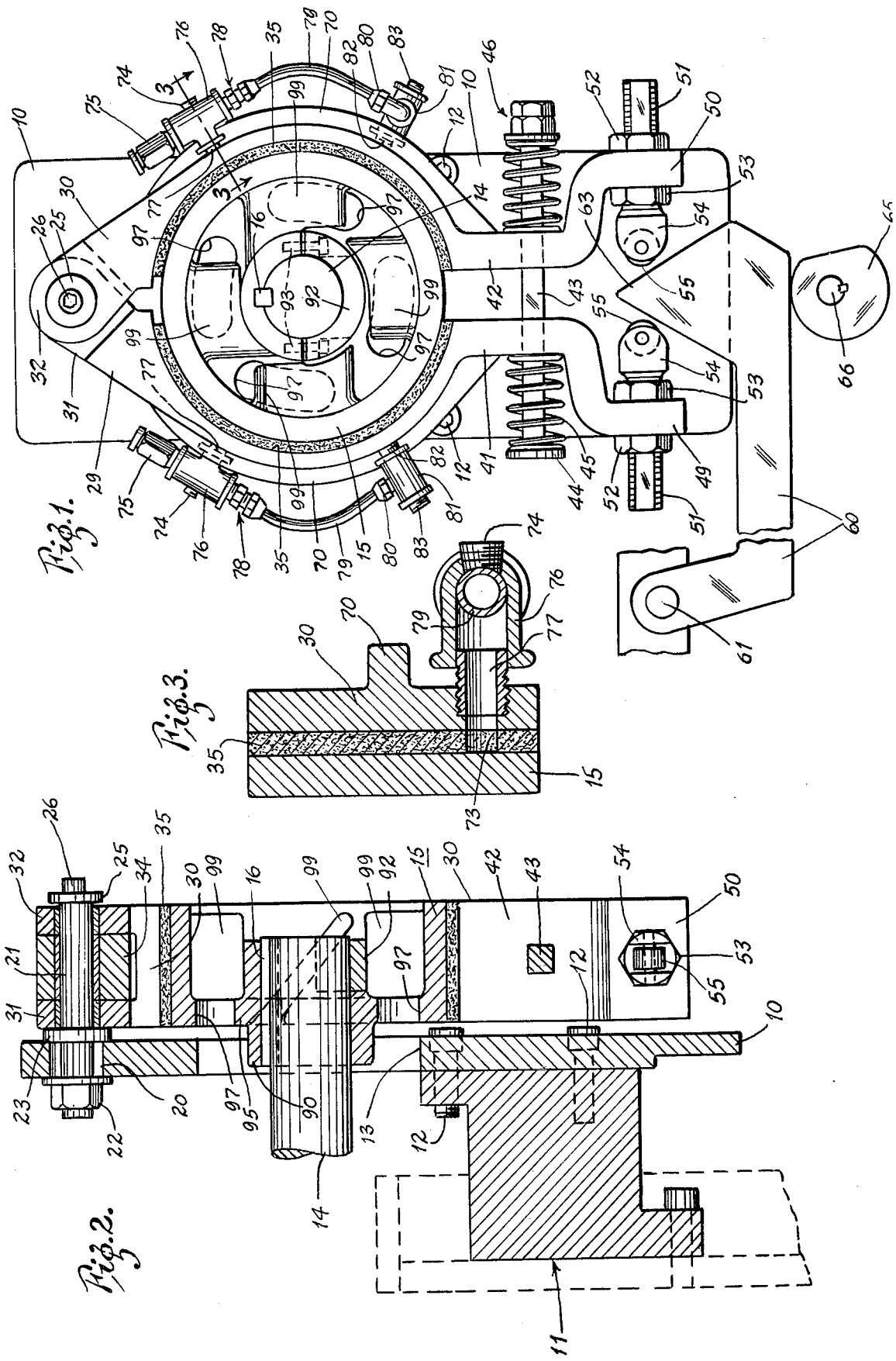

BRAKE MECHANISM AND COOLING STRUCTURE THEREFOR

BACKGROUND OF THE INVENTION

Heretofore, as in the U.S. Pat. No. 3,200,910, in the name of Cunningham and Engle and the references cited therein, brakes of the present general type have been disclosed. This type usually includes at least one, and preferably two, arcuate brake arms pivoted on one side of the drum, extending around to the other side and spring-urged together to apply friction to the drum, and means to separate the arm to release the drum. In the cited prior art it is pointed out that it is important that the feed wheels of partition assembling machines stop quickly where a step, such as a cutting step, is to be performed on the material being fed. If the brake does not stop the feed rolls quickly, the paper may be caused to over-run or back up, ultimately resulting in a partition of irregular size.

The present improvement consists in novel air cooling means for the brake, so that the brake is air cleaned and is air cooled both on its outer and inner parts. The brake drum is provided with fins between the shaft and the cylindrical rim, with air ports adjacent the fins, so that as the drum rotates, air is drawn inside the rim to cool the inside parts of the drum. Then also there are longitudinal cooling fins on each brake shoe, and with two circumferentially spaced compressed air outlets for each brake arm: one outlet in the upper part and the other outlet in the lower part of each. Furthermore, one outlet is on one side of the cooling fin or rib, and the other outlet on the other side. This arrangement gives not only a more complete cleaning of the rotating brake drum, but also a more complete cooling of the outer parts of the drum and the shoes.

Another feature of the invention is that the brake operation itself is employed as a cutoff valve so that it is unnecessary to add external cutoff valves and the timing mechanisms that would be required to cause the air to flow at the proper time.

Also an improved arrangement for operating the brake arms has been provided which simplifies the operation and reduces the number of parts required.

In the drawings:

FIG. 1 is a front elevation of the brake of the present invention, the operating parts being shown somewhat diagrammatically;

FIG. 2 is a vertical section through the middle of FIG. 1;

FIG. 3 is an enlarged section on the line 3—3 of FIG. 1.

DETAILED DESCRIPTION OF THE PREFERRED EMBODIMENT

In the description to follow, the details of the partition assembler and stripper will not be given because of the information given in U.S. Pat. No. 3,200,910.

Here the brake sub-assembly includes a mounting plate 10 to be mounted upon an assembler and stripper 11 as by capscrews 12. The mounting plate 10 has an opening 13 through it to receive a driving shaft 14 onto which is mounted a brake drum 15 and to admit air flow. The brake drum 15 is secured to the shaft by appropriate means and is keyed thereto as at 16. It will be understood that the shaft 14 and hence the drum 15 rotates with the feed wheels.

The mounting panel 10 has another hole 20 in its upper part, through which a stud shaft 21 is mounted. This shaft is here shown as having a threaded end that receives a hex nut 22 that can draw a flange 23 on the shaft into a clamping relationship with the mounting panel 10. The shaft 21 extends beyond the flange 23, and on its outer end it receives a washer 25 held in place by a cap screw 26. Between the flange 23 and the washer 25 two brake arms 29 and 30 are rockably mounted on the shaft. They are complementary in shape.

The arm 29 has a bifurcated upper end, comprising mounting ears 31 and 32 that are rockably mounted on the shaft 21 adjacent the flange 23, with an appropriate bushing. They embrace a similar mounting ear 34 projecting from the upper end of the other arm 30, and also rockably mounted on the shaft 21.

As is evident from FIG. 1, the two brake arms extend downwardly in a more or less semi-circular manner so that between them they embrace substantially all of the brake drum 15. Each is cut out in an arcuate manner and is provided with a brake lining of approximately 180 degrees as shown at 35. Thus when the two brake arms 29 and 30 are squeezed together, they force the brake linings 35 against the drum for braking action.

The two arms extend downwardly from the drum in spaced relation to give two spaced projecting arms 41 and 42 that are generally parallel. A pin 43 passes through the two arms. On one end it has a flange 44 retaining a coil spring 45 between the flange and the arm. At its other end it is threaded and has a nut-lock nut arrangement 46 that confines another coil spring 47 between appropriate washers and the arm projection 42. These two springs are compression springs and normally urge the two brake arms into braking relationship with the drum. The lock nuts 46 can be adjusted to change the compression of the brake shoes on the drum.

The two arms 41 and 42 separate below the pin 43 and provide two somewhat more separated downward projections 49 and 50. Each of these receives a threaded pin 51 having lock nuts 52 and 53 by means of which it can be adjustably positioned and firmly secured in adjusted position on its brake arm. Also each includes at its outer end a bifurcated fitting 54 that holds a roller 55. The two rollers face each other and are normally separated when the brake arrangement is set up.

A brake-actuating arm 60 is pivoted at 61 to some appropriate part of the framework of the machine so that it can move its tapered point or wedge 63 upwardly or downwardly. This wedge can project between the two rollers 55 when it is moved upwardly, separating them so that the brake is released. The point in the upward movement at which each brake shoe is released, can be adjusted by adjusting the nuts 52, 53, and the amount of separation of each shoe from the drum.

A cam 65 is mounted on a shaft 66 appropriately supported on the frame of the machine. This cam turns and causes the foregoing motion of the arm 60 in an upward direction, downward movement of the arm being normally effected by the springs 45 and 47.

As shown in FIG. 1 particularly, each of the two brake arms 29 and 30 is provided with a cooling fin or rib 70. These cooling ribs extend circumferentially, generally medially of the two arms. They increase the area for delivery of heat to the surrounding atmosphere. In addition, specific air-cooling means are provided. They are the same for each of the two brake arms, so only one need be described.

A fitting 75 can be connected to a source of air under pressure. It introduces this air to a T 76 that is connected by a nipple 77 into the brake shoe on one side of the rib 70. A hole 73 (FIG. 3) is drilled through the brake arm and the brake lining. Usually this is done in situ to obtain proper alinement between the hole sections in the arms and linings. Hence it must be drilled through the T 76 and later plugged at 74.

With appropriate fittings 78, a tube 79 is also connected to the T 76. This tube 79 leads to a fitting 80 connected to a T 81 that is connected by a nipple 82 to the brake arm 29, in this case on the side of the cooling rib 70 opposite to the connector 77. Again this brake arm and brake shoe are drilled through so that air may be conducted to the drum, and the T is plugged at 83.

A further means is provided for cooling the inner parts of the brake and for maintaining a cooling action during rotation of the drum. This consists in forming the brake drum 15 with fins that can draw air through air passages in the drum as the drum rotates. The drum 15 has a hub 90 that projects backwardly from the rim of the drum, and also projects forwardly inside the drum, being cut away to provide a semicylindrical overhang inside the drum. The hub 90 surrounds the shaft 14 and is keyed thereto, as previously indicated, by the key 16 which engages in a slot in the internal surface of the hub 90. When the drum 15 is fitted onto the shaft 14, it is secured against axial movement on the shaft by a semi-circular cap 92 that is held by cap screws 93 onto an overhanging complementary portion of the hub 90. Access holes extend through the rim opposite the screws, to receive a screw driver for engaging and disengaging the screws.

The hub 91, other than the cap 92, is preferably formed as a single casting having a radial web 95 connecting the outer cylindrical drum portion 96 to the hub 90. The web 95 has a plurality of air vent openings 97 around it, and in front of each opening 97 there is an angularly-disposed fin 99. Four such fins are illustrated. In FIG. 2, for clarity, the top and bottom fins are shown full, although technically they would be cut through at the diameter line. The fins 99 extend integrally forwardly from the web 95 and terminate near the front end of the drum viewed from the position of FIG. 1.

The inner edges of the fins, toward the axis, are shaped to accommodate the presence of the removable bearing cap 92. The fins are also located and shaped so that they do not interfere with inserting or removing the screws 93 that hold the bearing cap in place.

OPERATION

When the shaft 14 is properly rotating, it must be free of the braking action. This means that the arm 60 must have raised the wedge 63 to engage the two rollers 55 and spread the arms 29 and 30 to withdraw the brake linings 35 from the drum.

Withdrawal of the linings 35 from the drum surface effects a cooling and cleaning of the outer parts of the brake. The action permits air flow through the fittings 75, thence it passes through the nipples 77, thence through the pipes 79 and the nipples 82. It emits from the holes such as 73, coaxial with the two nipples, to impinge upon the rotating drum.

It will be noted that the two nipples in each case are circumferentially and axially spaced from each other so that each side of the drum receives air at points about 180 degrees apart. This air cools both sides of the outer parts of the drum and shoes, and also should be given enough velocity to clean the drum. This last feature is of particular importance because of the possibility of the accumulation of dust and other particles such as worn away brake lining particles resulting from the operation of the machine, which would interfere with the effectiveness of the braking action and perhaps permit brake slippage.

It is also important that the air is cut off automatically in this arrangement. Whenever the brake is applied by the springs 45, the linings fit closely against the drum 15 in such wise as to prevent significant escape of air. Therefore, outside valving and timing mechanism is unnecessary. There is thus automatic timing between the action of the cam 65 and the air delivery, it being understood that the shaft 66 is keyed keyed to the operation of the feeding rolls of the machine.

Further, during operation of the machine, a further cooling action takes place, that is particularly applied to the inner parts of the brake. The fins 99 rotate with the drum, and draw air in from the back of the brake, through the ports or holes 97 in the web of the drum, thence forward and out the front of the brake. This flow of air dissipates heat during rotation of the drum, and is particularly effective on the inner parts of the rim and drum.

Various changes and modifications may be made within this invention as will be readily apparent to those skilled in the art. Such changes and modifications are within the scope and teaching of this invention as defined by the claims appended hereto.

What is claimed is:

1. In a brake mechanism for industrial machinery requiring properly coordinated and accurate braking of intermittently operating shafts, wherein there is a shaft-driven brake drum and braking means on only one surface thereof; the braking means including a brake arm pivotally mounted to extend around the brake drum and having an arcuate shape to receive a brake lining portion engageable with the drum; means to urge the brake arm toward the drum to produce engagement of the brake lining with the drum, to bring the drum from a running condition at least substantially to a stop by sliding friction, the brake arm being withdrawable from the drum to permit free rotation thereof; cooling gas conducting means having a gas output in the brake arm with a duct leading the gas through the brake arm and the brake lining so that it may impinge upon the drum whenever the brake arm and lining are removed from the drum, the duct opening into the braking surface of the lining in a brake drum-contacting portion thereof, and terminating short of the sides of the said portion, so that it is effectively closed off whenever the braking means is in braking engagement with the drum, the opposite side of the drum being continuously exposed to the atmosphere.

2. In the brake mechanism of claim 1, the brake arm being on the outside of the drum, the gas conduit means including outlet means leading through the brake lining in brake drum-contacting portions thereof, to conduct the gas to outside of the drum to cool the same, and fan-like fin means inside the drum to direct air across the inside parts of the brake.

3. In the brake mechanism of claim 2, with two gas outlets laterally displaced in the direction coaxially with the drum so as to impinge air on different axially-spaced parts of the drum surface, both outlets terminating within the lateral limits of the brake drum conducting portion of the lining.

4. In the brake of claim 3, the brake arm having a cooling fin extending medially thereof and the gas conducting means being present in each arm and being arranged to project cooling gas on two different axially-spaced parts of the drum on opposite sides of the cooling fin.

5. In the brake of claim 1: additional means to control flow of cooling air over the drum, the drum having a cylindrical flange against the outside of which the brake lining may engage, and mechanism to apply a current of air inside the flange in addition to the previously-mentioned cooling gas, the said mechanism comprising fan-type fins on the drum inside its flange, that produce air flow inside the flange during rotation of the drum.

* * * * *